US008016734B2

(12) United States Patent
Fort

(10) Patent No.: US 8,016,734 B2
(45) Date of Patent: Sep. 13, 2011

(54) APPARATUS AND METHODS FOR NON-CONTACT ADHESIVE DISPENSING TO MANUFACTURE BAGS

(75) Inventor: Wesley C. Fort, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 92 days.

(21) Appl. No.: 12/045,316

(22) Filed: Mar. 10, 2008

(65) Prior Publication Data

US 2008/0234120 A1    Sep. 25, 2008

Related U.S. Application Data

(60) Provisional application No. 60/896,351, filed on Mar. 22, 2007.

(51) Int. Cl.
*B31B 1/62* (2006.01)
(52) U.S. Cl. ........ 493/264; 493/193; 493/196; 493/198; 493/210; 493/276
(58) Field of Classification Search .................. 493/186, 493/193–194, 196, 198, 210, 254, 264, 269, 493/267, 276
See application file for complete search history.

(56) References Cited

U.S. PATENT DOCUMENTS

| | | | | |
|---|---|---|---|---|
| 2,154,521 A | * | 4/1939 | Maxfield | 53/449 |
| 2,759,400 A | * | 8/1956 | Randall | 493/235 |
| 4,256,526 A | * | 3/1981 | McDaniel | 156/295 |
| 4,493,685 A | * | 1/1985 | Blamer | 493/235 |
| 4,509,642 A | * | 4/1985 | Rowell | 206/219 |
| 4,588,463 A | * | 5/1986 | Barber et al. | 156/200 |
| 4,681,228 A | * | 7/1987 | Kerry et al. | 206/484 |
| 4,734,956 A | * | 4/1988 | Frey et al. | 138/118.1 |
| 5,421,803 A | * | 6/1995 | Kemanjian | 493/198 |
| 6,149,567 A | * | 11/2000 | Capy et al. | 493/219 |
| 6,561,696 B1 | * | 5/2003 | Rusnak et al. | 383/75 |
| 6,626,353 B1 | | 9/2003 | Fort | |
| 6,902,639 B1 | * | 6/2005 | Perelman et al. | 156/203 |
| 7,726,098 B2 | * | 6/2010 | Doll | 53/412 |

OTHER PUBLICATIONS

Bancroft Bag, Inc., Introduction to Bag Styles, Internet web page "www.bancroft.bag.com/bagstyles.html" printed Jun. 26, 2008.
Roberts Polypro, Pop-Up Paper Handle Applicator Overview, Internet web page "www.robertspolypro.com/products/pop-up-paper-handle-applicator" printed Jun. 26, 2008.
Roberts Polypro, Window Film Applicator Overview, Internet web page "www.robertspolypro.com/products/window-film-applicator" printed Jun. 26, 2008.

* cited by examiner

*Primary Examiner* — Christopher Harmon
(74) *Attorney, Agent, or Firm* — Wood, Herron & Evans, LLP

(57) ABSTRACT

Various methods of forming bags include applying hot melt adhesive to material without contacting the material with the dispenser that applies the adhesive. The material may be provided in various forms, such as elongate sheet material dispensed from a roll, or elongate tube material that is flattened to define first and second oppositely disposed sidewalls, for example. The material may be provided in single plies, multiple plies, or as separate sheets that are cut, folded, or otherwise manipulated to form bags, with the adhesive joining selected portions of the bag. A nozzle for dispensing hot melt adhesive includes an air passage that is inclined in a direction toward a liquid outlet. The air passage communicates with an air outlet disposed in a common plane with the liquid outlet.

6 Claims, 11 Drawing Sheets

US 8,016,734 B2

APPARATUS AND METHODS FOR NON-CONTACT ADHESIVE DISPENSING TO MANUFACTURE BAGS

This application claims priority to U.S. Provisional Patent Application No. 60/896,351, filed Mar. 22, 2007, which is incorporated by reference herein in its entirety.

TECHNICAL FIELD

The present invention relates generally to adhesive dispensing, and more particularly to apparatus and methods for non-contact adhesive dispensing to manufacture bags from sheet material.

BACKGROUND

Many different styles of bags and sacks (hereinafter "bags") have been formed from sheet material which has been cut, folded and sealed using adhesives. Conventionally, adhesive has been applied to the sheet material by a wheel which receives adhesive from a well and thereafter transfers the adhesive to selected portions of the sheet material as the wheel is rolled over the sheet material. The use of wheels to apply adhesive in this manner slows down production throughput and is generally messy and wasteful of adhesive. To address these issues, hot melt adhesives have been applied by dispensers having slot-type nozzles which dispense thin coats of adhesive to the sheet material as the sheet material is moved passed the nozzle and is brought into contact with the nozzle. While dispensing hot melt adhesives from such slot-type nozzles is generally suitable for bags manufactured from Kraft paper, difficulties have been encountered when hot melt adhesives have been dispensed to polymeric materials from slot-type nozzles. In particular, the increased temperatures of the hot melt adhesive and the slot-type nozzles tend to burn through the polymeric sheet material, or to cause undesirable shrinking and/or wrinkling of the sheet material.

A need therefore exists for improved apparatus and methods for applying adhesives to Kraft paper and polymeric sheet material during the manufacture of bags and which overcomes these and other drawbacks of the prior art.

SUMMARY

The present invention overcomes the foregoing and other shortcomings and drawbacks of methods and apparatus heretofore known for forming bags. While the invention will be described in connection with certain embodiments, it will be understood that the invention is not limited to these embodiments. On the contrary, the invention includes all alternatives, modifications and equivalents as may be included within the spirit and scope of the present invention.

According to one aspect of the present disclosure, a method of forming a bag includes feeding a flat, elongate material for forming the bag through a bag-forming machine. Hot melt adhesive is applied by a dispenser to at least a selected portion of the material without contacting the material with the dispenser. The adhesive may thereafter be caused to operatively engage a surface, such as another portion of the material or a separate bag material material or article, to thereby join the selected portion of the material with the surface during formation of the bag.

In one embodiment, the material may comprise an elongate sheet dispensed from a roll, and the sheet may be folded to contact another portion of the sheet with the hot melt adhesive. In another embodiment, the material may comprise an elongate tube formed from at least one ply of sheet material that is flattened to define first and second oppositely disposed sidewalls of the sheet material. In yet another embodiment, the material may comprise first and second sheets that are subsequently joined together by the hot melt adhesive.

In another aspect, the bag material may be cut, folded, stitched, or otherwise processed to form various types of bags. In still another embodiment, the adhesive may be brought into contact with elongate cord material after being applied to the bag material, whereby a bag with handles may be formed.

In yet another aspect, a nozzle for dispensing hot melt adhesive includes a nozzle body having a first side and a second side. A liquid passage extends between the first and second sides of the nozzle body and communicates with a liquid outlet on the second side. An air passage extends between the first and second sides and is inclined in a direction toward the liquid outlet. The air passage communicates with an air outlet that is on the second side of the nozzle body and is disposed in a common plane with the liquid outlet.

These and other features, objects and advantages of the invention will become more readily apparent to those skilled in the art in view of the following detailed description, taken in conjunction with the accompanying drawings.

DETAILED DESCRIPTION

Figure 1:
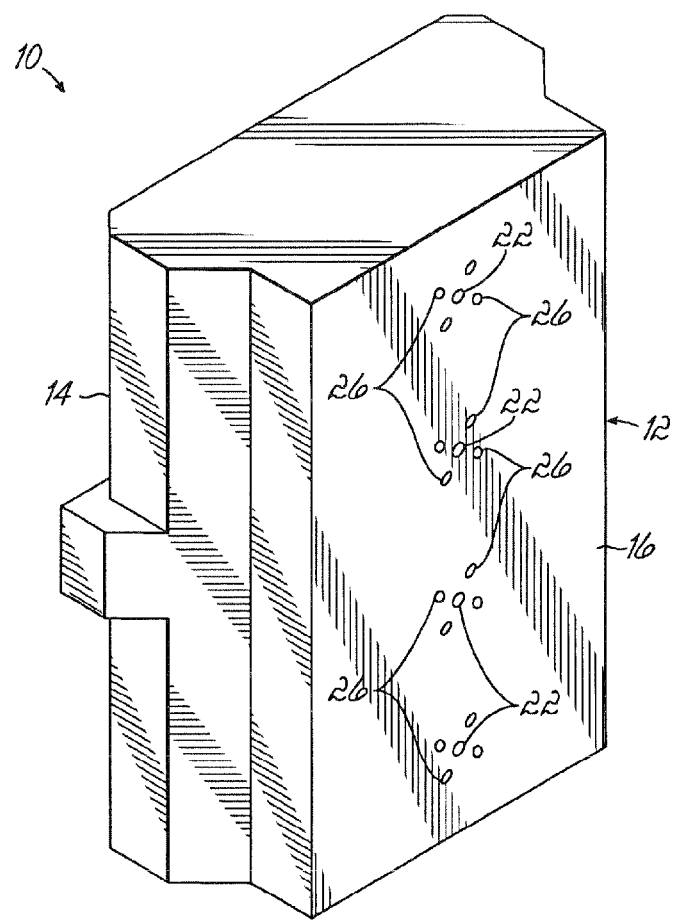
FIG. 1 is a perspective view depicting an exemplary nozzle for non-contact dispensing of hot melt adhesive.
Figure 3:
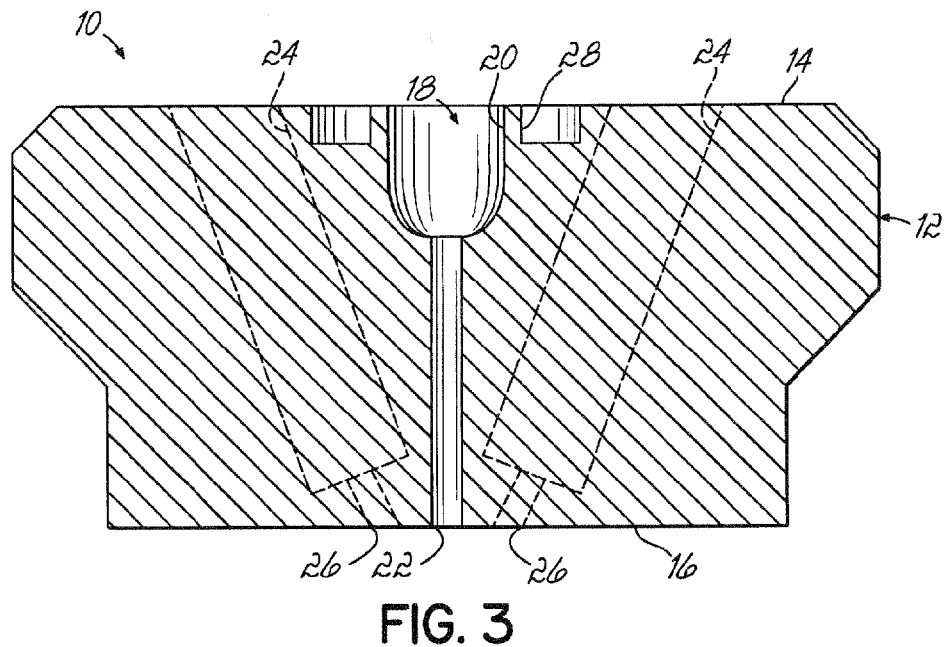
FIG. 3 is a cross-sectional view of the nozzle of FIG. 2, taken along line 3-3.
Figure 2:
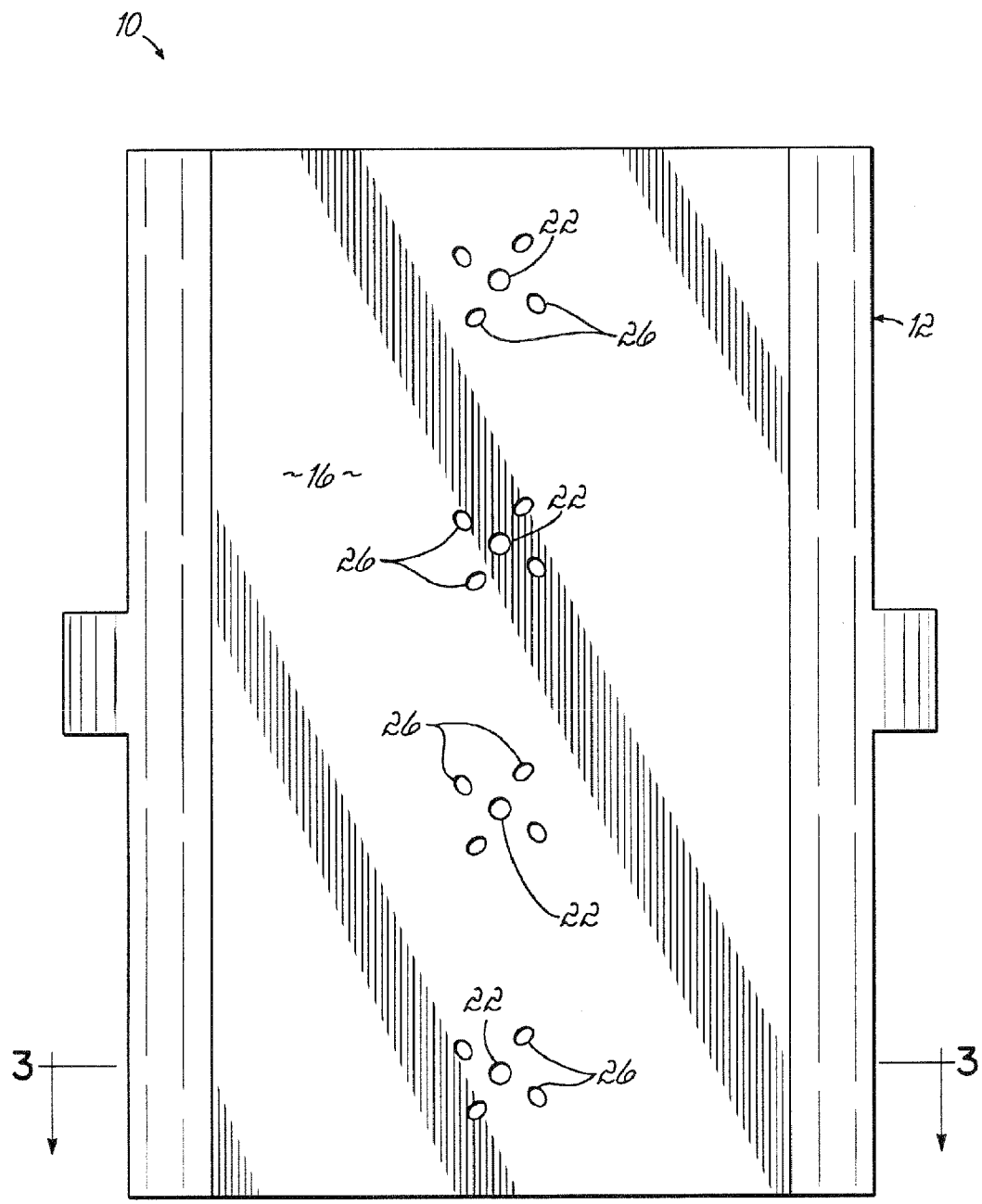
FIG. 2 is a bottom, plan view of the nozzle of FIG. 1.

FIGS. 1-3 depict an exemplary nozzle 10 for non-contact dispensing of hot melt adhesive to moving substrates, such as sheet material, during the manufacture of bags. The nozzle 10 comprises a nozzle body 12 having a first side 14 that is adapted to be coupled to an adhesive dispenser configured to supply liquid adhesive and process air to the nozzle, and a second side 16 through which adhesive material is dispensed to sheet material that is moved beneath the nozzle 10. In the embodiment shown, the first and second sides 14, 16 are disposed on oppositely facing surfaces of the nozzle body 12 and are in substantially parallel planes. It will be appreciated, however, that the first and second sides 14, 16 of the nozzle body 12 may alternatively be on adjacent surfaces of a nozzle body 12, or may otherwise be in planes which are oblique to one another.

With reference to FIG. 3, the nozzle 10 includes at least one liquid passage 18 extending between the first and second sides 14, 16 of the nozzle body 12. In this embodiment, the liquid passage 18 includes an enlarged cavity 20 adjacent the first side 14, whereby liquid adhesive may be received from the dispenser into the nozzle 10. A liquid outlet 22 on the second side 16 of the nozzle body 12 communicates with the liquid passage 18 whereby liquid material may be dispensed from the liquid outlet 22 to a substrate moving beneath the nozzle 10. The nozzle 10 further includes at least one air passage 24 extending between the first and second sides 14, 16 of the nozzle body 12. In the embodiment shown, four air passages 24 are associated with each liquid outlet 22 and are inclined with respect to the liquid passage 18 extending between the first and second sides 14, 16 of the nozzle body 12. It will be appreciated that the nozzle 10 may alternatively have fewer than four air passages 24 associated with each liquid outlet 22, or more than four air passages 24 associated with each liquid outlet 22.

When the nozzle body 12 is coupled to an adhesive dispenser, air may be received into the air passages 24 from the first side 14 of the nozzle body 12 and directed toward the second side 16 of the nozzle body 12 where the air exits through an air outlet 26 positioned near an associated liquid outlet 22. The air outlets 26 are disposed in the same plane as their associated liquid outlet 22 and have generally oval shapes as a result of the inclination of the air passages 24 with respect to the liquid passage 18. A channel 28 disposed between the liquid passage 18 and the air passages 24 prevents cross communication of the process air and liquid adhesive.

In use, a substrate, such as sheet material used for manufacturing bags, is passed beneath the nozzle 10 without contacting the second side 16 of the nozzle 10. Hot melt adhesive flows into the liquid passage 18 from the adhesive dispenser and is dispensed through the liquid outlet 22, while process air from the dispenser flows through the air passages 24 and exits the air outlets 26 such that streams of process air impinge upon the dispensed stream of adhesive to cause the adhesive stream to oscillate or swirl prior to being deposited on the moving substrate. The deposited adhesive therefore has a swirl-shaped pattern corresponding to the movement of the adhesive stream. It will be appreciated that various other patterns of dispensed adhesive are also possible. Moreover, adhesive material may be dispensed in a continuous manner, or may be dispensed intermittently to selected portions of the substrate.

Figure 4:
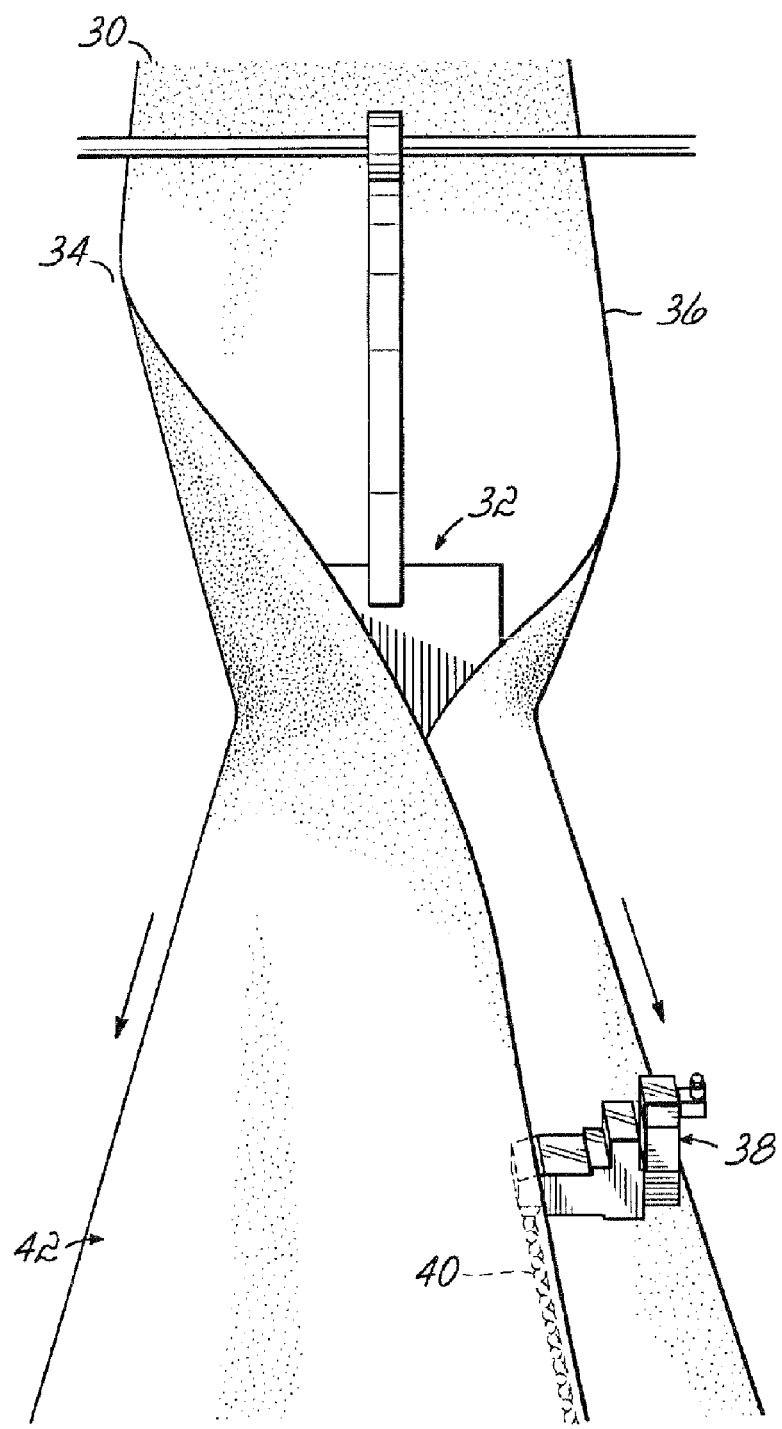
FIG. 4 is a schematic illustration depicting an exemplary method of applying adhesive to sheet material during the formation of a tubular web that may be subsequently processed to manufacture bags.

FIG. 4 depicts a method of forming a bag wherein sheet material 30 is fed into a bag forming machine adapted to fold and secure the sheet material 30 into a tubular shape. Sheet material 30 such as Kraft paper or polymeric sheet material is fed in a machine direction from a supply roll (not shown). The sheet material 30 passes a tube forming element 32 which causes the first and second oppositely disposed side edges 34, 36 of the elongate sheet material 30 to be folded inwardly such that one of the edges 34 overlaps the opposite edge 36. Hot melt adhesive is applied along one of the side edges 34, 36 of the folded sheet material 30 whereafter the folded side edges 34, 36 may be pressed together and joined by the hot melt adhesive to form a tubular web 42.

A dispensing module 38, including a nozzle 10 as described above, is used to apply the hot melt adhesive 40 in a non-contact manner as the sheet material 30 is fed past the dispensing module 38 in the machine direction. Thereafter, subsequent processing steps may be performed on the now tubular-shaped material, as will be described in more detail below, to form various styles of bags. In the embodiment shown, hot melt adhesive 40 is applied to the folded sheet material 30 in a substantially continuous swirl pattern along one of the side edges 36 of the folded sheet 30. It will be appreciated, however, that the hot melt adhesive 40 may alternatively be applied intermittently along the length of the sheet material 30, or that various other patterns of dispensed adhesive material may be applied to the folded sheet 30. Because the nozzle 10 of the dispensing module does not contact the sheet material 30, the process desired above is suitable for forming tubular webs from polymeric sheet material.

Figure 5:
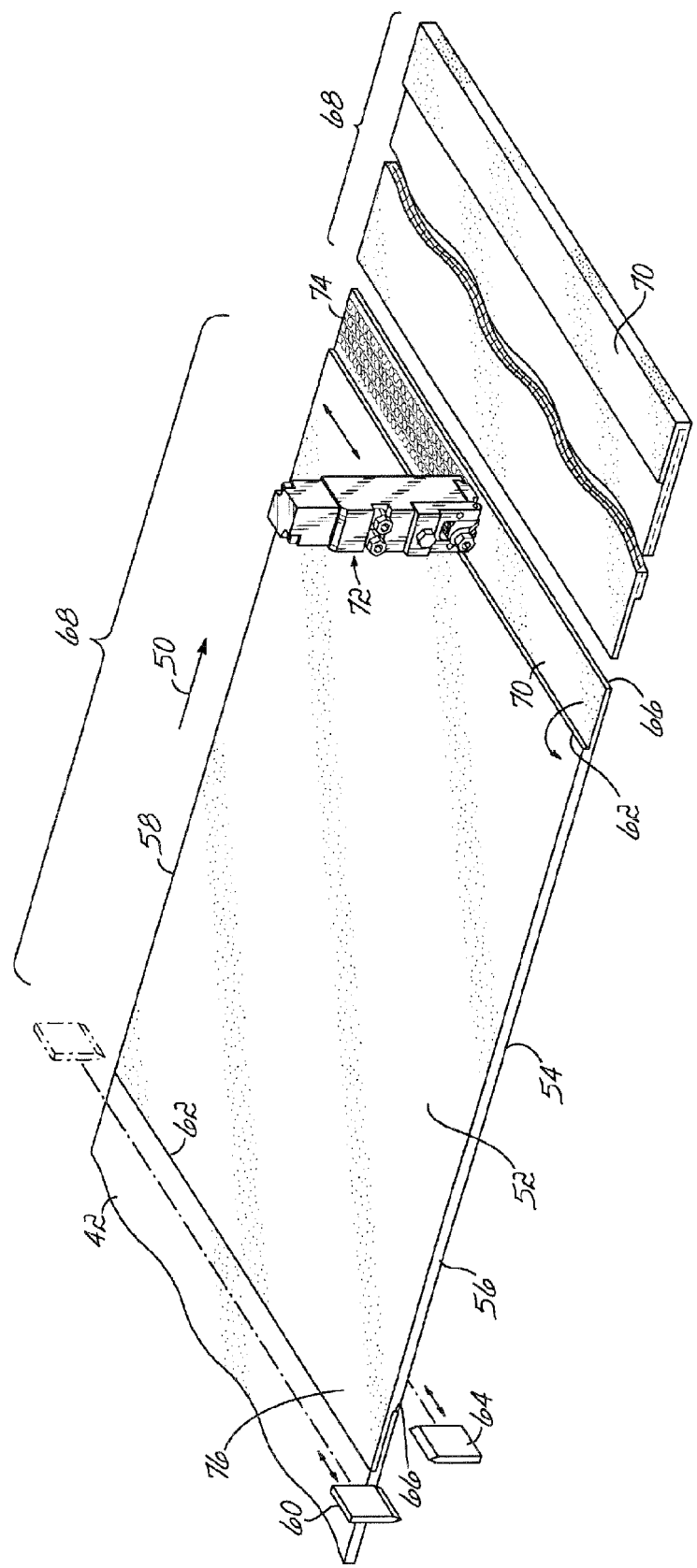
FIG. 5 is a schematic illustration depicting an exemplary method of manufacturing pinch-bottom bags.

FIG. 5 illustrates another exemplary method of forming a bag in accordance with the principles of the present invention. In this embodiment, an elongate tube of material, such as the tubular web 42 described above, is fed in a machine direction (indicated by arrow 50) through a bag forming machine. The tubular web 42 is in a generally flattened shape defining first and second oppositely disposed sidewalls 52, 54 and first and second oppositely disposed side edges 56, 58. As the in-fed tubular web 42 moves in the machine direction a first cutting device 60 is moved across the tubular web 42 in a direction transverse to the machine direction 50 to cut the first sidewall 52 of the tubular web 42 while leaving the second sidewall 54 intact, thereby forming a first cut edge 62. A second cutting device 64 is also moved in a direction transverse to the machine direction 50 to cut the second sidewall 54 of the tubular web 42 while leaving the first sidewall 52 intact, thereby forming a second cut edge 66. The spacing between the first and second cutting devices 60, 64 and the speed of the tubular web 42 in the machine direction 50 is selected such that the first and second cut edges 62, 66 formed by the first and second cutting devices 60, 64 are spaced from one another in the machine direction 50. During formation of the first and second cut edges 62, 66, the first and second cutting devices 60, 64 also separate a discreet length of tubular material 68 from the elongate in-fed tubular web 42. This discreet length of material 68 subsequently will be processed to form a bag. As the discreet lengths 68 of tubular material continue along the machine direction 50, they are separated to expose a flap 70 between the first and second cut edges 62, 66. An adhesive dispensing module 72 including a nozzle 10 as described above, is moved in a direction transverse to the machine direction 50 and applies hot melt adhesive 74 to the flap 70 without contacting the flap 70. The flap 70 may thereafter be folded over such that the adhesive 74 contacts the first sidewall 52 to seal the end of the discreet length of tubular material 68 thereby forming a pinch bottom bag.

If desired, adhesive material 74 may also be applied to a second flap 76 that is formed on the opposite end of the discreet length of tubular material 68 during the cutting process. In one embodiment, adhesive may be applied to the second flap 76 to seal the bag after the bag has been filled. Adhesive is usually applied in this manner at an end user's manufacturing or packaging plant. Alternatively, a reactivatable adhesive may be applied during manufacture of the bag and may be reactivated at an end user's facility after the bag has been filled.

In the embodiment shown, hot melt adhesive 74 is applied to the first flap 70 in a substantially continuous swirl pattern. It will be appreciated, however, that adhesive 74 may alternatively be applied in various other patterns or may be applied intermittently to the first flap 70 of the bag.

Figure 6:
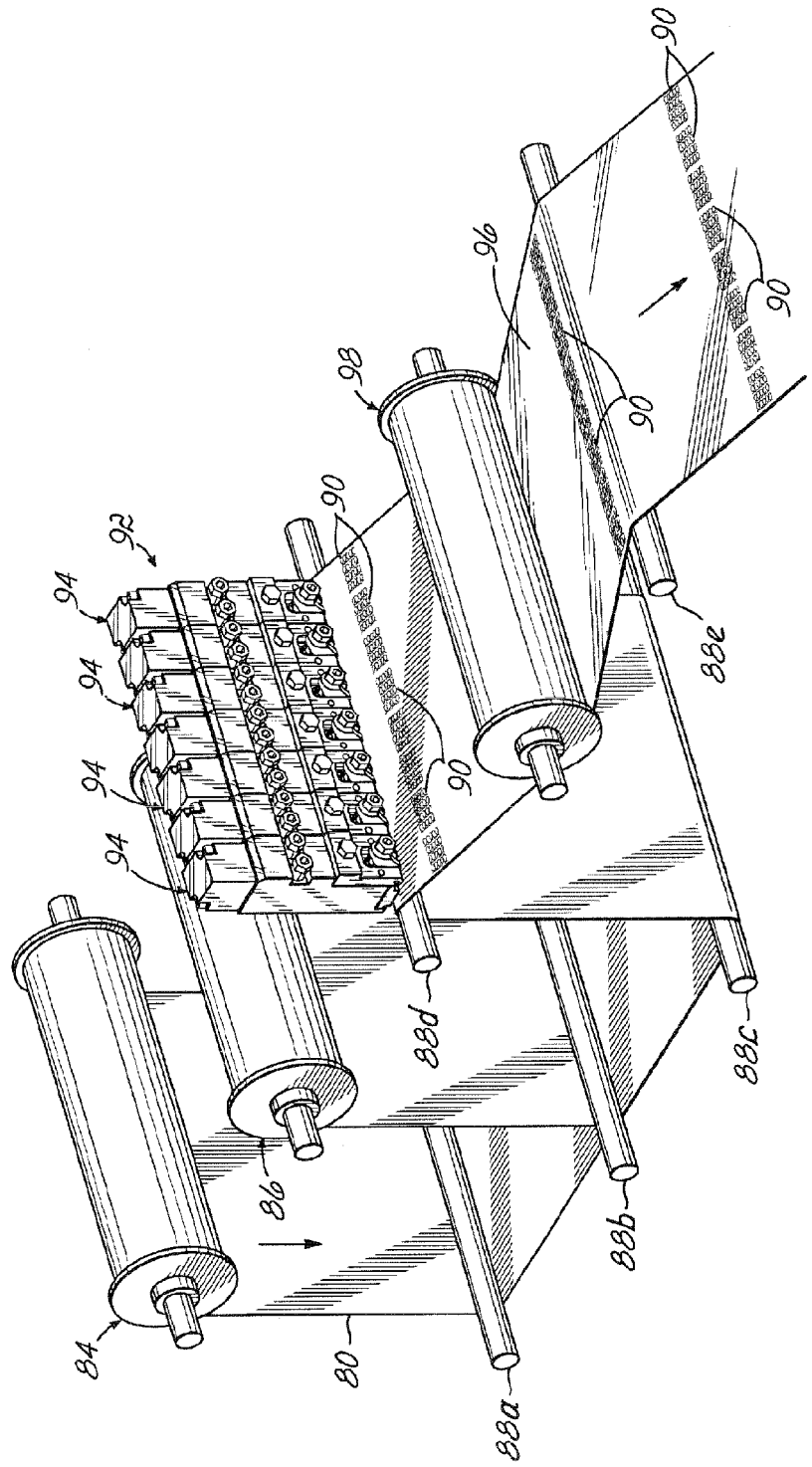
FIG. 6 is a schematic illustration depicting an exemplary embodiment wherein adhesive is applied to manufacture a multi-ply sheet material by skip laminating.

FIG. 6 depicts another exemplary embodiment wherein a multi-ply laminate is formed and which may be subsequently processed to create multi-ply bags. In the embodiment shown, first and second sheet materials 80, 82 are dispensed from first and second supply rolls 84, 86 and are passed over a series of rollers 88a, 88b, 88c such that the first and second sheet materials 80, 82 are brought in confronting contact with one another and are aligned in a machine direction. As the first and second sheet materials 80, 82 are passed over another roller 88d hot melt adhesive 90 is applied from a bank 92 of dispensing modules 94 each having dispensing nozzles 10 as described above. The hot melt adhesive 90 is applied to a side surface of the second sheet 82 without contacting the side surface of the sheet 82 with the dispensing modules 94. A third sheet material 96, which may be a polymeric material, is dispensed from a third supply roll 98 and is directed over a roller 88c to contact the second sheet material 82 to which the hot melt adhesive 90 has been applied. The hot melt adhesive 90 thereby joins the third sheet material 96 to the second sheet material 82. The resulting laminate may be subsequently processed to form any variety of multi-ply bags.

In this embodiment, hot melt adhesive 90 is applied by the bank 92 of dispensing modules 94 at discreet intervals along the in-fed sheet materials in what is commonly referred to as a skip laminating process. It will be appreciated, however, that the hot melt adhesive 90 may alternatively be dispensed in a generally continuous manner along the sheet material 82. The hot melt adhesive 90 may be applied in a swirl pattern or various other patterns. While the third sheet material 96 has been described herein as a polymeric material, it will be understood that the third sheet material 96 may be Kraft paper or various other materials. Likewise, the first and second sheet materials 80, 82 may be Kraft paper, polymeric material, or any other material suitable for manufacturing a multi-ply bag.

Figure 7:
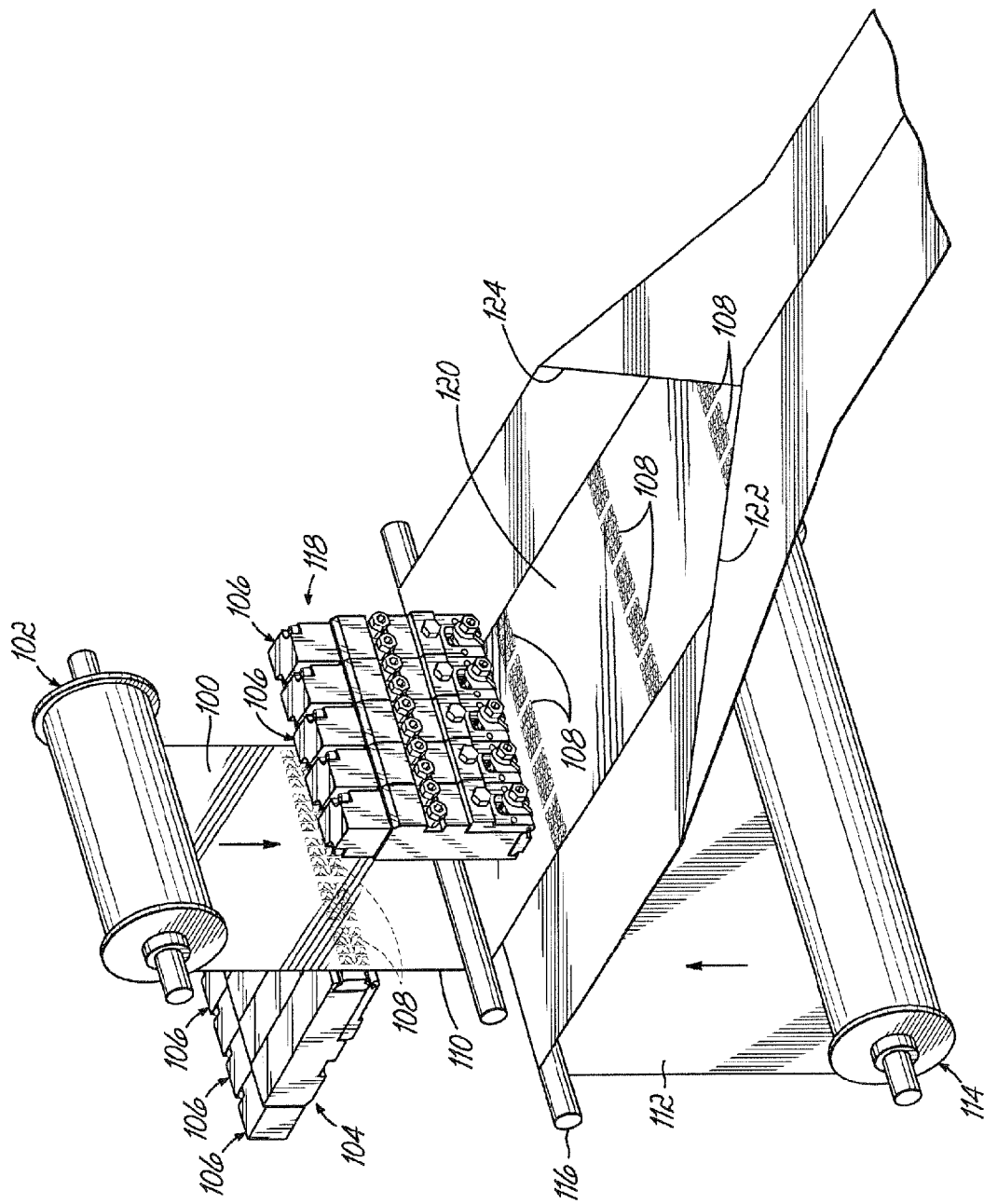
FIG. 7 is a schematic illustration depicting an exemplary skip laminating process wherein an in-fed material is a tubular web.

FIG. 7 depicts another exemplary embodiment, similar to that discussed above with respect to FIG. 6 wherein hot melt adhesive is applied to an in-fed substrate in a skip laminating process. In this embodiment, a first substrate 100 in the form of an elongate tubular web is fed in a machine direction from a supply roll 102. A first bank 104 of adhesive dispensing modules 106, including nozzles 10 as described above, dispenses hot melt adhesive 108 in a swirl pattern to a first sidewall 110 of the in-fed tubular web, intermittently along the length of the tubular web and without contacting the tubular web. A second substrate 112 in the form of a sheet is dispensed from a second supply roll 114 and is passed over a roller 116 to be joined with the tubular web. The in-fed second substrate 112 contacts the first sidewall 110 of the tubular web and is joined thereto by the hot melt adhesive 108 disposed therebetween. As the first and second substrates 100, 112 continue moving in the machine direction, a second bank 118 of adhesive dispensing modules 106 applies hot melt adhesive 108 in a swirl pattern to the second sidewall 120 of the tubular web without contacting the second sidewall 120. The hot melt adhesive 108 is applied by the second bank 118 of dispensing modules 106 at various intervals spaced along the length of the tubular web. As the first and second substrates 100, 112 continue moving through the machine, first and second oppositely disposed side edges 122, 124 of the second substrate 112 are caused to be folded inwardly over the second sidewall 120 of the tubular web, such as by a tube former (not shown) discussed above, so that the second substrate 112 is joined to the second sidewall of the tubular web by the adhesive 108 disposed therebetween.

The first and second substrates 100, 112 may comprise Kraft paper, polymeric material, or various other materials suitable for forming bags. While the hot melt adhesive 108 has been shown and described herein as being dispensed in swirl patterns and intermittently applied to the first substrate 100, it will be appreciated that hot melt adhesive 108 may alternatively be applied in various other patterns and may be applied in a generally continuous fashion along the length of the in-fed substrate material.

Figure 8:
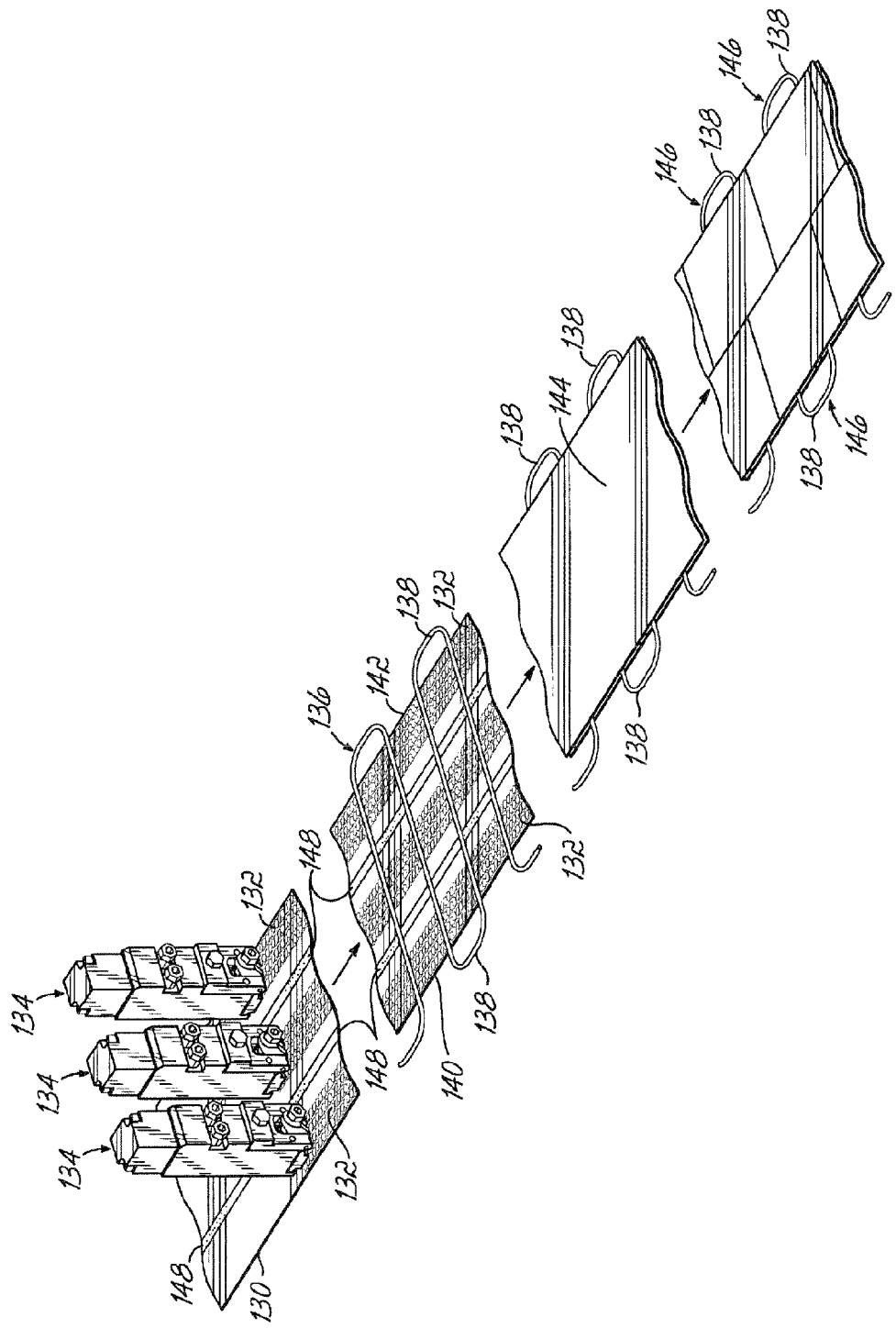
FIG. 8 is a schematic illustration depicting an exemplary method of forming corded handles for application to bags.

FIG. 8 depicts an exemplary method of forming handles that may be subsequently applied to bags. In the embodiment shown, an elongate sheet material 130 is fed in a machine direction while hot melt adhesive 132 is applied by one or more dispensing modules 134 without contacting the sheet material 130. In the embodiment shown, the hot melt adhesive 132 is dispensed in a generally continuous swirl pattern, but it will be appreciated that the hot melt adhesive 132 may alternatively be applied intermittently and may be applied in various other patterns. As the sheet material 130 continues to move in the machine direction, an elongate cord 136 is positioned atop the sheet material 130 in a sinusoidal pattern, with alternating turns 138 of the cord 136 extending beyond the first and second side edges 140, 142 of the sheet material 130. A second sheet material 144 may thereafter be applied atop the first sheet material 130 such that the cord 136 is captured between the first and second sheet materials 130, 144 and the sheet materials 130, 144 are secured by the hot melt adhesive 132 disposed therebetween. The cord 136 and first and second sheet materials 130, 144 may thereafter be separated into individual handle portions 146 each having a handle defined by the respective turns 138 which were extended beyond the first and second side edges 140, 142 of the sheet material. Individual handle portions 146 may thereafter be secured to the open ends of a bag to create a bag with carrying handles. The first and second sheet materials 130, 144 may comprise Kraft paper, polymeric material, or any other material suitable for securing the cord 136 to form a handle.

In another embodiment, cold glue 148 may also be applied to the first sheet material 130. The cold glue 148 cooperates with the hot melt adhesive 132 to secure the cord 136 to the first and second sheets 130, 144. The handle portions 146 are otherwise formed as described above.

Figure 9:
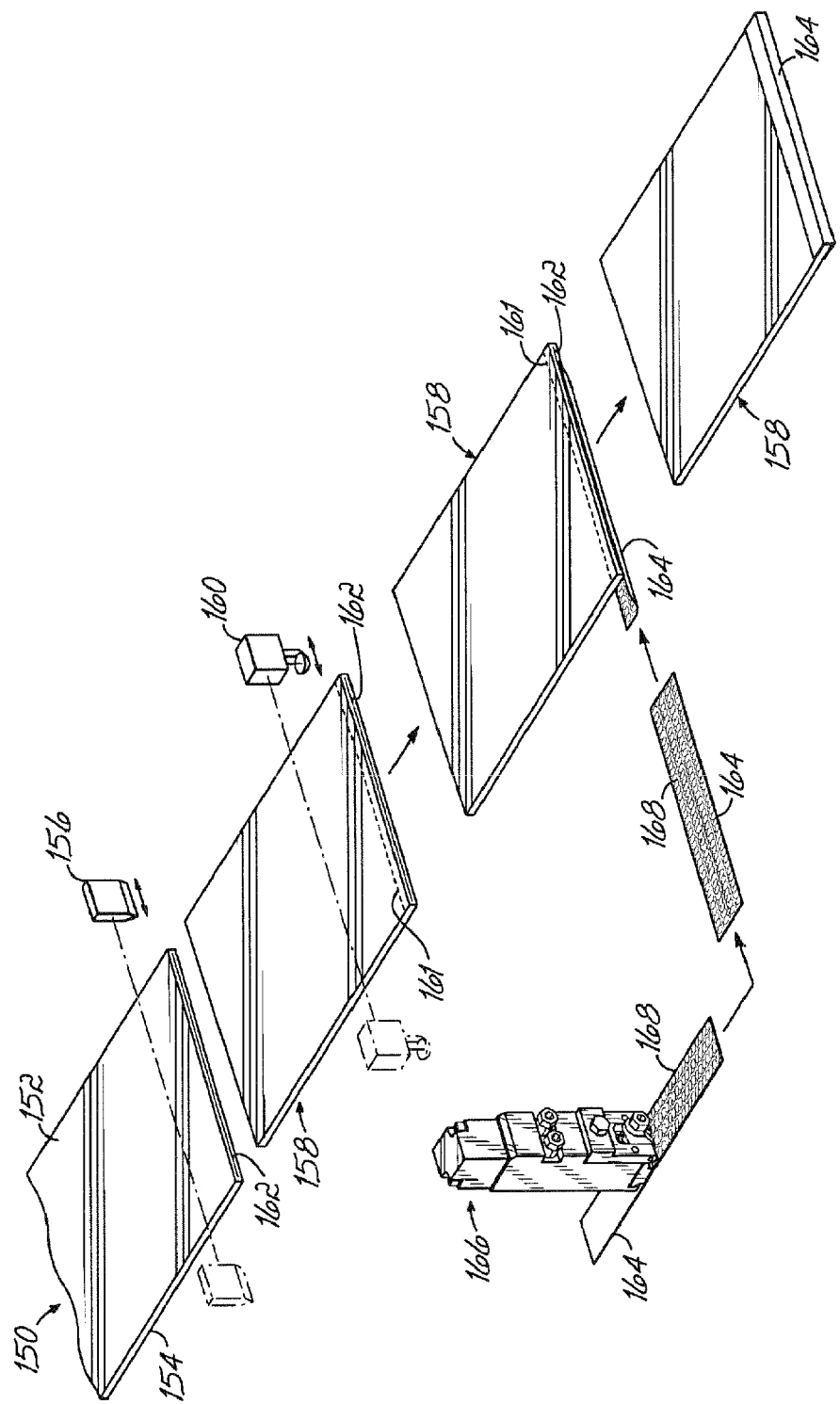
FIG. 9 is a schematic illustration depicting an exemplary method of manufacturing stitched-bottom bags.

FIG. 9 illustrates an exemplary method of forming a bag having a sewn or stitched bottom. In this embodiment, an elongate web of tubular material 150 is fed in a machine direction. The tubular material 150 is disposed in a generally flat condition such that first and second oppositely disposed sidewalls 152, 154 of the tube are pressed together in confronting relation. As the tubular material 150 moves in the machine direction a cutting device 156 is moved across the tubular material 150 in a direction transverse to the machine direction to cut the tubular material 150 into discreet lengths which will form the bags 158. As the bags 158 continue to move in the machine direction, a sewing or stitching device 160 is moved across the first, cut end 162 of the bag 158 and seals the first end 162 of the bag 158 by stitching the oppositely disposed sidewalls 152, 154 together with a filament 161. While the cutting and stitching devices 156, 160 have been shown and described herein as individual devices adapted to perform the cutting and stitching operations separately, it will be appreciated that the cutting and stitching devices 156, 160 may alternatively be combined into a unitary device which cuts and stitches the first end of the bags 158 simultaneously.

As the bags 158 continue to move along the machine direction, a separate strip of material 164 is moved beneath an adhesive dispensing module 166 having a nozzle 10 as described above. The module 166 applies hot melt adhesive 168 to one side of the strip material 164 without contacting the strip material 164. The strip material 164 with the hot melt adhesive 168 is moved into a position adjacent the first end 162 of the bag 158 and is folded over the first end 162 to cover the stitched portions of the first end 162 of the formed bag 158. While the formation of bag 158 has been depicted and described above in a process where hot melt adhesive 168 is applied to the strip material 164 before application to the bag 158, it will be appreciated that hot melt adhesive may alternatively be applied to the first end 162 of the bag 158 and the strip material 164 subsequently joined to the first end 162 to cover the stitched portions of the bag 158.

The tubular material 150 used to form the bags 158, or the strip material 164 used to seal the first end 162 of the stitched bag 158 may comprise Kraft paper, polymeric material, or various other materials suitable for forming a bag 158. In this embodiment, the adhesive dispensing module 166 applies a substantially continuous layer of hot melt adhesive 168 to the strip 164 in a swirl pattern. It will be appreciated, however, that the hot melt adhesive 168 may alternatively be applied to only discreet portions of the strip material 164 and may be applied in various other patterns.

Figure 10:
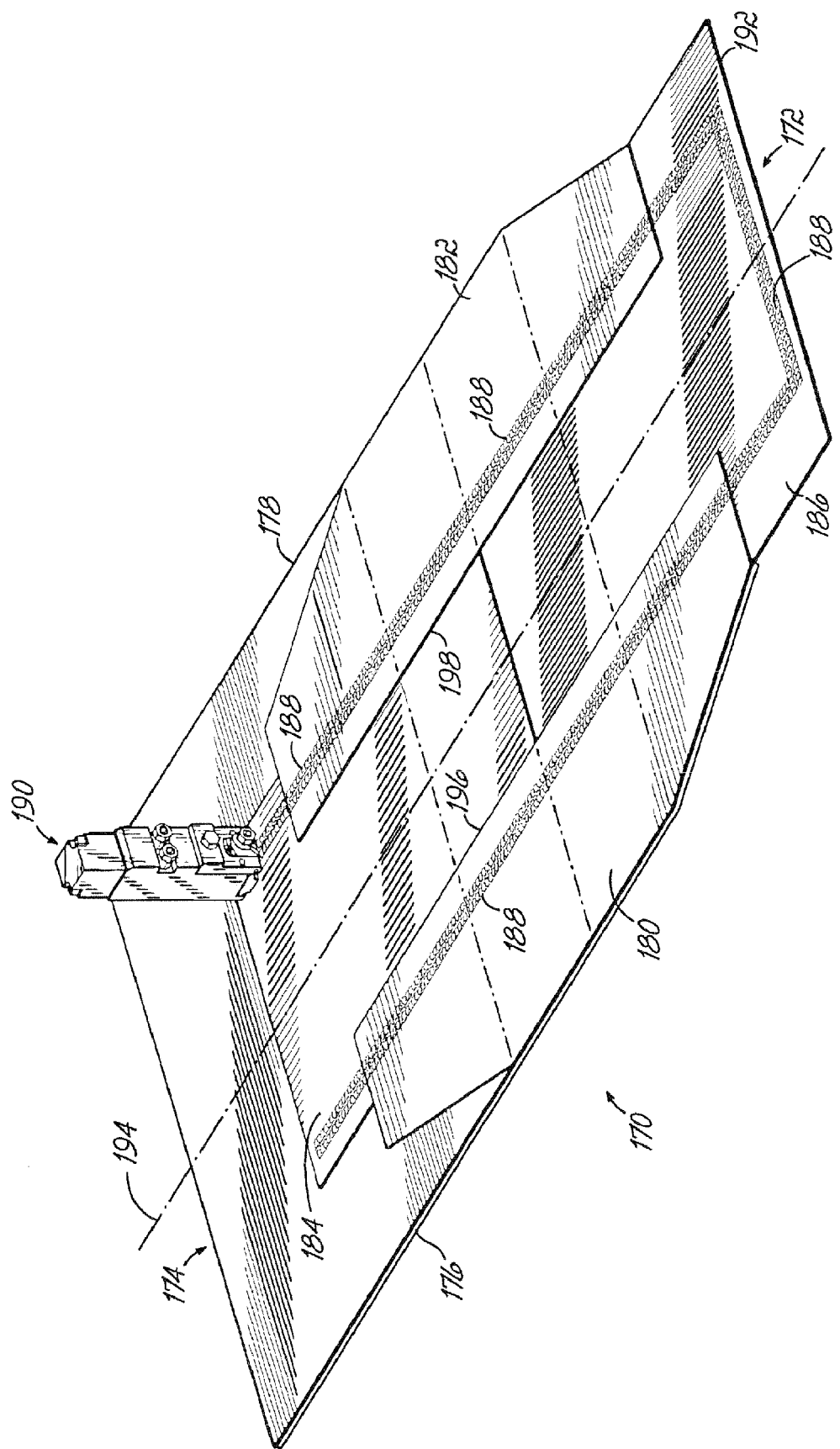
FIG. 10 is a schematic illustration depicting an exemplary method of forming the bottom of a self-opening sack.

FIG. 10 illustrates an exemplary method of forming a bag having a generally flat bottom wall, typical of self-opening sacks that are commonly used for grocery bags. To form the flat bottom of the bag, discreet lengths 170 are cut from an elongate tubular web, such as the tubular web 42 described above, so that the discreet lengths 170 have first and second open ends 172, 174. The tubular form is folded and flattened to define accordion-style gussets along first and second side edges 176, 178 of the bag. The first end 172 of the tubular material is cut and folded to define first, second, third and fourth flaps 180, 182, 184, 186 that will form the bottom wall of the bag, as known in the art. Hot melt adhesive 188 is applied by a dispensing module 190, including a nozzle 10 as described above, to selected portions of the flaps 180, 182, 184, 186. In the embodiment shown, hot melt adhesive 188 is applied in a non-contact manner along the distal edge 192 of the fourth flap 186 and in a direction generally transverse to the longitudinal centerline 194 of the bag. Adhesive material 188 is also applied to portions of the fourth flap 186 on opposite sides of the longitudinal centerline 194, and along the distal edges 196, 198 of the first and second flaps 180, 182 in directions generally parallel to the longitudinal centerline 194 of bag. The third flap 184 is then folded over the first and second flaps 180, 182 such that the third flap 184 is adhered to the first and second flaps 180, 182 by the adhesive 188 disposed therebetween. The fourth flap 186 is subsequently folded over the first, second, and third flaps 180, 182, 184 such that the fourth flap 186 is adhered to the first, second, and third flaps 180, 182, 184 by the adhesive 188 disposed therebetween and to form a flat bottom wall of the bag.

Figure 11:
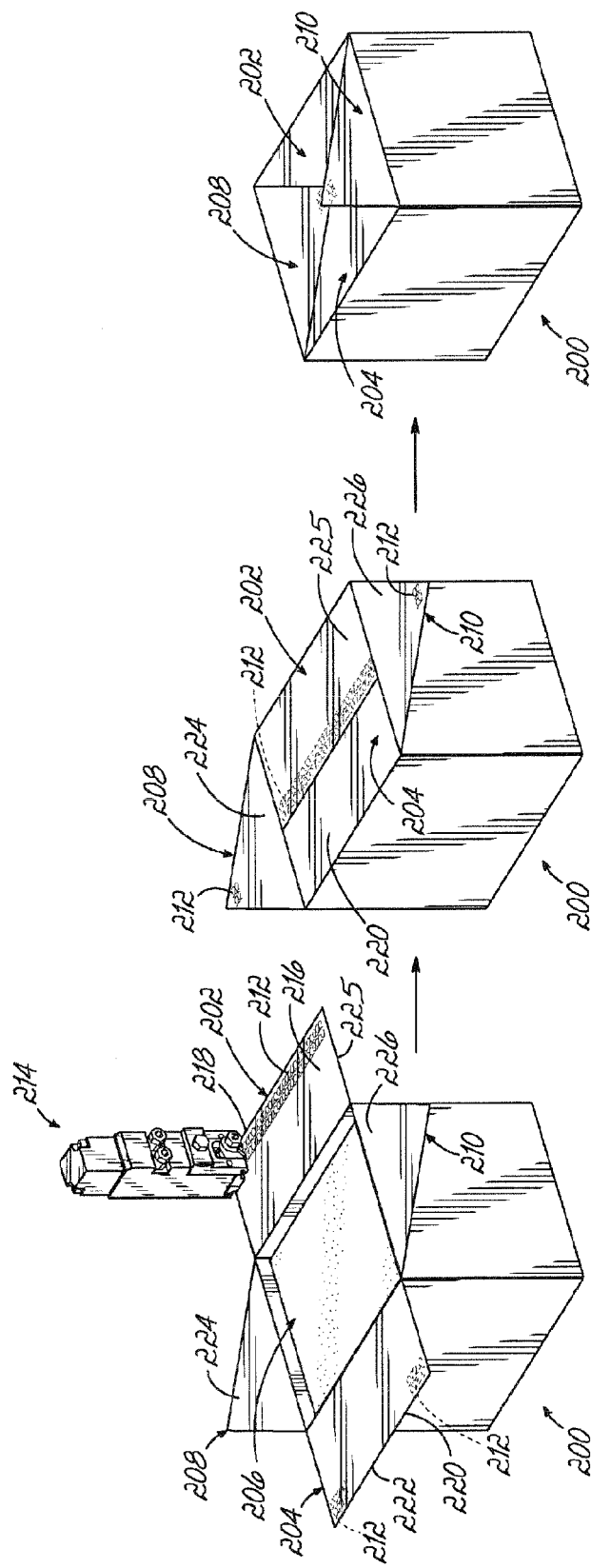
FIG. 11 is a schematic illustration depicting an exemplary method of forming a sift proof closure.

FIG. 11 illustrates a method of forming a sift proof seal using hot melt adhesive applied to flaps of an open bag or other type of container. In this embodiment, a bag 200 includes first and second flaps 202, 204 disposed on opposite sides of the open end 206 of the bag 200, and third and fourth flaps 208, 210 disposed on opposite sides of the open end 206 of the bag 200 and positioned between the first and second flaps 202, 204. Each flap 202, 204, 208, 210 has a first side surface facing toward the open end 206 and a second side surface facing away from the open end 206 of the bag 200. Each flap 202, 204, 208, 210 also has a proximal edge hingedly joined to the bag 200 at the open end 206, and distal edge opposite the proximal edge.

The sift proof seal is formed by applying hot melt adhesive 212 from a dispensing module 214, including a nozzle 10 as described above, to the first side 216 of the first flap 202 and along the distal edge 218 of the first flap 202, without contacting the first flap 202 with the dispensing module 214. Hot melt adhesive 212 is also applied from the dispensing module 214 to the second side 220 of the second flap 204 at locations adjacent the distal edge 222 of the second flap 204, without contacting the second flap 204 with the dispensing module 214. The second flap 204 is then folded inwardly toward the open end 206 and the first flap 202. The first flap 202 is folded over the second flap 204 such that the second side 220 of the second flap 204 and the first side 216 of the first flap 202 are in confronting contact and are adhered to one another by hot melt adhesive 212 disposed therebetween.

Hot melt adhesive 212 is then applied to the first sides 224, 226 of the third and fourth flaps 208, 210, along distal edges thereof, without contacting the third and fourth flaps 208, 210 with the dispensing module 214. The third flap 208 is then folded over the first and second flaps 202, 204 such that the first side 224 of the third flap 208 is in confronting contact with the second sides 225, 220 of the first and second flaps 202, 204 and is joined to the first and second flaps 202, 204 by the adhesive 212 disposed therebetween. Finally, the fourth flap 210 is folded over the first and second flaps 202, 204 such that the first side 226 of the fourth flap 210 is in confronting contact with the second sides 225, 220 of the first and second flaps 202, 204 and is joined to the first and second flaps 202, 204 by the adhesive disposed therebetween.

In each of the embodiments described herein, materials used to form the bags, or intermediate components which are subsequently processed to form bags, may comprise various types of sheet material suitable for manufacturing the bags, such as Kraft paper, polymeric material, or various other materials.

Figure 12:
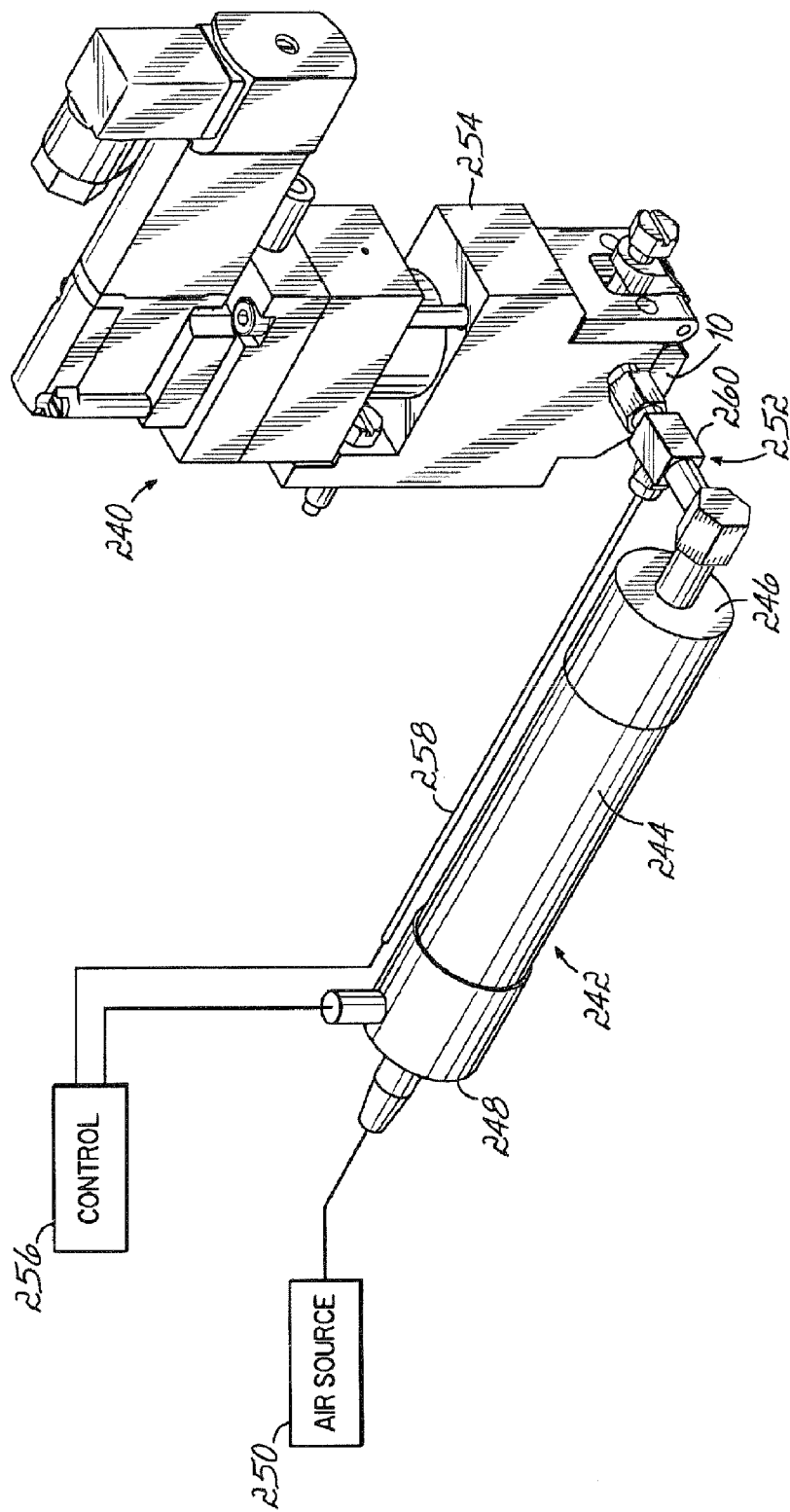
FIG. 12 is a partial perspective view of an exemplary dispensing module and air heater.

Referring now to FIG. 12, a liquid material dispenser includes a manifold (not shown) adapted to supply liquid material, such as adhesive or coating material, to one or more dispensing modules 240 having nozzles 10 for applying the liquid material to a substrate. The manifold may also include a liquid material heater to heat the liquid material as it passes through the manifold to the module 240. The dispenser further includes a separate air heater 242 that can be coupled to the module 240 to heat process air that will be used to rotate the dispensed liquid, or to move the dispensed liquid in a desired pattern. Although not required, the heated process air may also be used to draw and attenuate the dispensed liquid if desired. Because the air heater 242 is separate from the manifold of the dispenser, it can heat the process air to a temperature that is independent of the temperature of the manifold and liquid material. The temperature of the process air can therefore be controlled to be higher or lower than the temperature of the liquid material, as may be desired for a particular application. This is in contrast to conventional liquid material dispensers that only permitted the process air to be heated to the same temperature as the liquid manifold. As non-limiting examples, the air may be heated to about 50 degrees Fahrenheit higher than the liquid material, to about 100 degrees Fahrenheit higher than the liquid material, to about 150 degrees Fahrenheit higher than the liquid material, or even higher. The temperature of the process air may therefore be overdriven relative to the temperature of the liquid material to an extent that is greater than conventional dispensers. By varying the temperature and volume of the process air, the dispensed liquid pattern may be selectively controlled without the need to modify the nozzle 10.

In one embodiment, the dispensed liquid material is adhesive and the air heater 242 is controlled to heat process air independently of the temperature of the dispensed adhesive such that the pattern of the dispensed adhesive is varied without modifying the nozzle 10. For example, the dispensed adhesive may be applied to a substrate as a swirl pattern, as a coating typical of slot-type nozzles, or as an atomized spray by varying the temperature and/or volume of the process air without altering or replacing the dispensing nozzle 10. Such a dispenser may be useful for applying adhesive during the manufacture of bags, as described above, where the amount of adhesive applied to the materials used to form the bags may be greater than that of other adhesive dispensing applications. The dispenser may also be useful for applying labels, coatings, or for various other applications.

The dispenser may be particularly useful for applying adhesive, or other liquid materials, to substrates, such as cartons, bags, envelopes, etc., where conventional nozzles are not suitable for applying the liquid material in sufficient volume, with sufficient speed, and with a clean cut-off. Moreover, the ability to control the temperature of the air facilitates greater control of the bond strength that can be achieved with adhesive materials. In contrast to conventional applicators that require adhesive to be applied in an off-line operation, the dispenser described herein permits adhesives and coatings to be applied in-line during manufacture, therefore increasing efficiency and through-put while reducing or eliminating down time. As non-limiting examples, the dispenser may be used to apply adhesives or other liquid materials during the manufacture or application of window patches to envelopes or folding cartons; handles for bags or cartons, including pull-up type handles (known in industry as "Wilton handles"); reinforcement patches for handles applied to bags or cartons; easy-open inserts for cartons or bags; labels; coupons that are applied to bags, cartons, printed sheet or card stock, or other packages; seals for sift-proof cartons; pour spouts for bags and cartons; tortuous seams for sealing bags or cartons, wherein the seam is configured to allow air to be expelled from the closed package without allowing air and/or moisture to enter the package; and various other applications.

In the embodiment shown, the air heater 242 comprises a housing 244 having a first end 246 coupled to a module 240, and a second end 248 adapted to be coupled to a source of pressurized air 250, such as via a hose or conduit. The housing 244 contains a heating element (not shown), such as an electrical resistance heater, or any other type of heating device suitable for heating process air. Process air from the source 250 enters the second end 248 of the housing 244 and passes over the heating element. The air may be heated to temperatures substantially equal to the temperature of the adhesive, or to as much as about 800 degrees Fahrenheit. Heated air exits the first end 246 of the housing 244, such as through fittings 252 and enters the body 254 of the module 240, whereafter it is directed to air passageways 24 in a nozzle 10, as described above. The heated air exits the nozzle 10 through one or more air outlets 26 and is directed toward the dispensed adhesive material, as described above.

In another embodiment, operation of the process air heater 242 may be controlled by a dispenser controller (not shown) that is also adapted to control the temperature of the manifold and various other aspects of the operation of the dispenser. Alternatively, operation of the air heater 242 may be controlled by a separate controller 256 that is independent of the dispenser controller and is electrically coupled to the air heater 242. The dispenser may further include a thermocouple, or any other suitable temperature sensing device, for monitoring the temperature of the heated process air and providing signals to a controller related to the sensed temperature. The control of the air heater 242 may be based on closed loop feedback of signals from the thermocouple.

In the embodiment shown, thermocouple 258 is exposed to the heated air exiting the first end 246 of the air heater 242, such as by a fitting element 260, and is electrically coupled to independent controller 256. It will be appreciated that the thermocouple 258 may alternatively be integrated within the housing 244 of the air heater 242, or may be electrically coupled to the dispenser controller (not shown). When the thermocouple is integrated within housing 244 of the air heater 242, greater on/off control of the heater may be achieved.

While various aspects in accordance with the principles of the invention have been illustrated by the description of various embodiments, and while the embodiments have been described in considerable detail, they are not intended to restrict or in any way limit the scope of the invention to such detail. The various features shown and described herein may be used alone or in any combination. Additional advantages and modifications will readily appear to those skilled in the art. The invention in its broader aspects is therefore not limited to the specific details, representative apparatus and methods, and illustrative examples shown and described. Accordingly, departures may be made from such details without departing from the scope of the general inventive concept.

What is claimed is:

1. A method of forming a bag, comprising:
dispensing an elongate first sheet from a roll;
feeding the first sheet through a bag forming machine;
applying hot melt adhesive from a dispenser to selected portions of the first sheet without contacting the first sheet with the dispenser;
folding the first sheet to contact another portion of the first sheet with the hot melt adhesive;
whereby a tube is formed by folding opposite side edges of the first sheet to overlap one another such that the overlapping side edges are bonded together by the adhesive without being bonded to other portions of the first sheet;
feeding a second sheet material through the bag forming machine;
wherein the hot melt adhesive is applied to a side surface of at least one of the first or second sheets; and
directing the first and second sheets together for confronting contact such that respective side surfaces are joined together with the hot melt adhesive disposed therebetween;
applying hot melt adhesive from a dispenser along a first side edge of the joined first and second sheets without contacting the sheets with the dispenser, wherein the first sheet is in the form of a tubular web; and
folding the joined first and second sheets such that the first side edge and a second, oppositely disposed side edge overlap one another and the hot melt adhesive applied along the first side edge joins the first and second side edges to form a tube surrounding the tubular web formed by the first sheet.

2. The method of claim 1, wherein the hot melt adhesive is applied continuously to selected portions of the at least one sheet.

3. The method of claim 2, wherein the hot melt adhesive is applied in a swirl pattern to the at least one sheet.

4. The method of claim 1, wherein the first sheet comprises multiple plies.

5. The method of claim 1, wherein the hot melt adhesive is applied intermittently to selected portions of the at least one sheet.

6. The method of claim 1, wherein at least one of the first and second sheets comprises polymeric material.

* * * * *